May 1, 1945.　　　C. F. FREDE　　　2,374,738
RAILWAY TRUCK BRAKE STRUCTURE
Original Filed June 14, 1940　　2 Sheets-Sheet 2

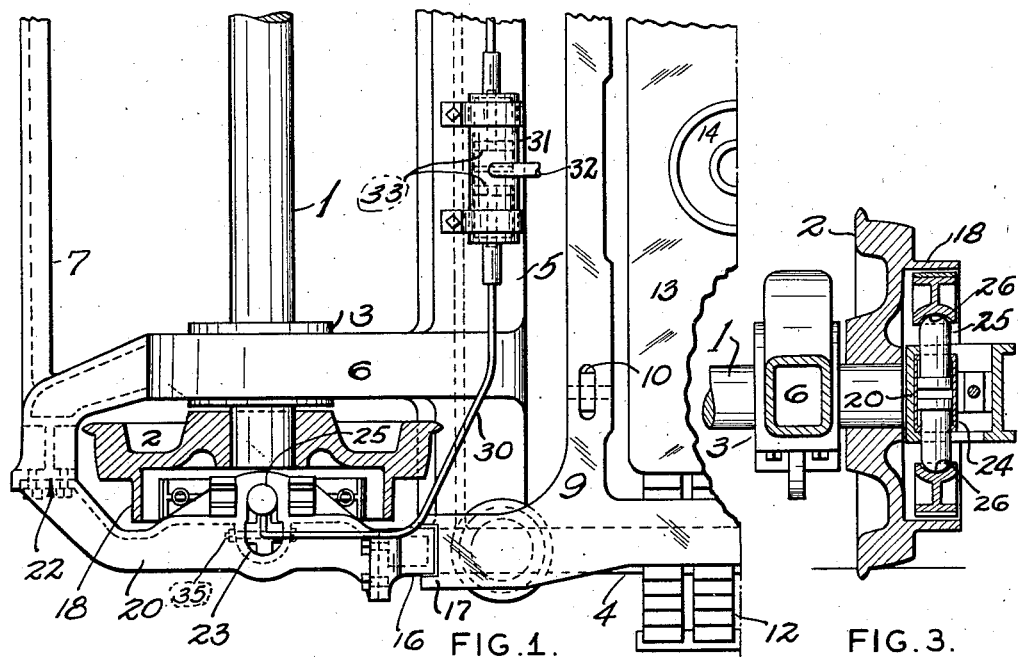

INVENTOR.
CHARLES F. FREDE
BY Rodney Bedell
ATTORNEY

Patented May 1, 1945

2,374,738

UNITED STATES PATENT OFFICE 2,374,738

RAILWAY TRUCK BRAKE STRUCTURE

Charles F. Frede, University City, Mo., assignor to General Steel Castings Corporation, Granite City, Ill., a corporation of Delaware Original application June 14, 1940, Serial No. 340,484, now Patent No. 2,298,286, dated October 13, 1942. Divided and this application October 29, 1941, Serial No. 416,967

11 Claims. (Cl. 188—153)

The invention relates to the provision of brakes on railway vehicle trucks, and more particularly to arrangements in which brake cylinders and pistons are provided for each wheel adjacent the outer face thereof.

One object of the invention is to effectively brake high speed railway vehicles, and to this end the invention comprises a clasp brake structure operated by a hydraulic cylinder or by a combination of hydraulic and pneumatic cylinders.

Another object of the invention is to simplify the assembly and disassembly of the braking structure with the remainder of the truck structure.

Another object of the invention is to simplify the application of the brakes and to eliminate various parts provided in connection with the usual brake beam suspended by brake hangers and actuated by levers and connection rods.

Another object of the invention is to avoid chatter resulting from the usual suspension of the brake beams.

Another object of the invention is to utilize the desirable features of brake drum and coacting shoe structure in a railway vehicle truck and thereby avoid the application of brake shoes to the wheel tread and the wear on the latter incidental to the usual railway brake arrangement which results in reducing the diameter of the wheels and tends to make the wheel treads out of round and flattened at points.

The present application is a division of an earlier application by the same inventor filed June 14, 1940, Serial No. 340,484, now Patent No. 2,298,286, issued October 13, 1942.

The above and other detail objects are attained by the structure illustrated in the accompanying drawings in which—

Figure 1 is a top view of one quarter of a four wheel equalized truck with brake arrangement embodying one form of the present invention, parts of the structure being sectioned horizontally to more clearly illustrate the construction.

Figure 2 is a side elevation of the structure shown in Figure 1.

Figures 3 and 4 are detail vertical transverse sections taken on the corresponding section lines of Figure 2.

Figure 5:
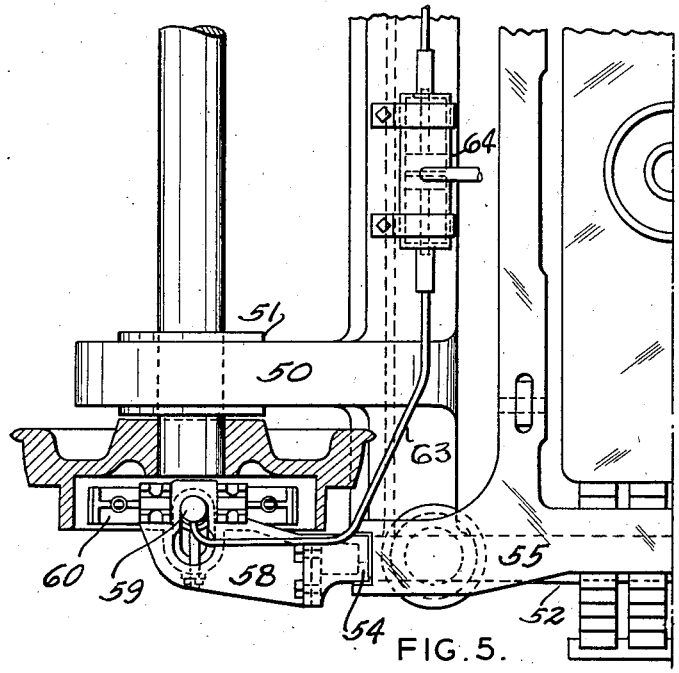
Figure 6:
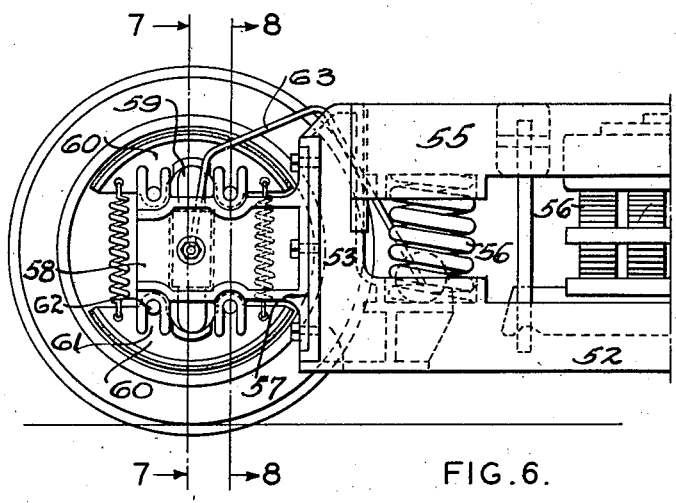

Figures 5 and 6 correspond to Figures 1 and 2 but illustrate another form of the invention.

Figure 7:
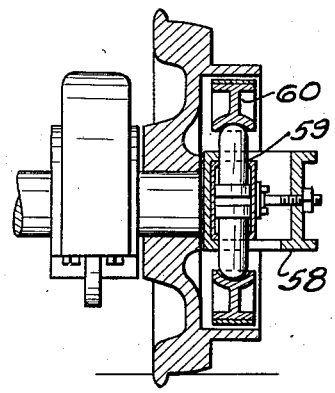
Figure 8:
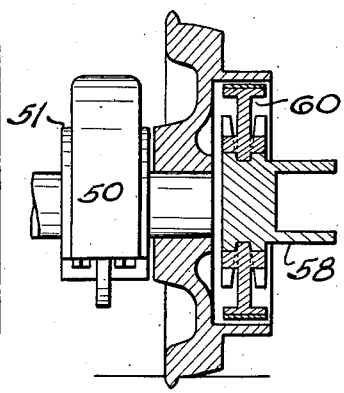

Figures 7 and 8 are detail vertical sections taken on the corresponding section lines of Figure 6.

It will be understood that the parts shown in Figure 1 are duplicated at the opposite side and end of the truck as shown diagrammatically in Figure 1a.

The truck axles 1, only one of which is shown, mount wheels 2 and are journalled in inside bearings 3 mounted in a rigid equalizer frame structure, preferably a unitary casting, comprising outer side members 4, extending substantially between the wheels, transverse transoms 5, inner side members 6 extending from transoms 5 and toward the ends of the truck where they are joined by transverse end members 7. Members 6 mount journal bearings 3 and the frame forms an equalizer between the spaced axles of the truck and mounts coil springs 8 which support a rectangular truck frame 9 from which are pivotally suspended links 10 supporting the usual spring plank 11 and bolster springs 12 which carry the truck bolster 13, having a center plate 14 mounting the vehicle body bolster (not shown).

The equalizer frame outer side members 4 terminate in uprights 15 having guide elements 16 received in suitable jaws 17 in truck frame 9 to hold the latter and the equalizer frame against relative movement longitudinally or horizontally of the truck while permitting their relative vertical movement due to the action of springs 8.

A unit comprising a brake and a brake mounting is detachably assembled with each wheel and the adjacent equalizer frame and includes a bracket 20 with its ends seated in pockets 21 and 22 provided in upright 15 and member 6 respectively. Bracket 20 includes a chamber 23 with an opening at its upper end adapted to accommodate the insertion into the chamber of a hydraulic cylinder 24, having double-acting pistons 25, which may then be moved laterally of the bracket towards the wheel so that the ends of the pistons may be seated in recesses 26 provided therefor in the spaced brake shoes 27. The shoes have renewable linings 28 for contacting the drum 18 provided on each wheel. Coil springs 29 hold shoes 27 in assembled relation with the pistons, cylinder and bracket 20 and pull the shoes away from the drum when the brakes are released. Bracket 20 and shoes 27 have interengaging elements 36 and 37 respectively forming stops or guides to keep the shoes in alignment with the brake drum and other brake parts.

A bolt 35, or like device, is provided to hold cylinder 24 and associated parts in assembled position. Upon removal of bolt 35, the cylinder may be moved laterally and upwardly for removal from bracket 20. Upon removal of the bolts holding bracket 20 to the frame parts, the bracket and the brake shoes mounted thereon may be removed from the other parts of the truck.

A conduit 30 connects each cylinder 24 with a master cylinder 31 preferably mounted on transom 5 and having an air line connection 32 to an air reservoir (not shown) on the vehicle body whereby air under pressure may be admitted to cylinder 31 by the reduction of the train line pressure as in the usual air brake system. Master cylinder 31 may be connected to the two wheels at one end of the truck or to all four wheels on the truck, and the cylinder is provided with air operated pistons 33 for applying pressure to hydraulic fluid in the master cylinder, conduits 30 and hydraulic cylinders 24 to actuate the brake pistons 25. If desired, individual air and hydraulic cylinders may be substituted for hydraulic cylinders 24, in which case the master cylinder would be omitted. Forms of the master cylinder and hydraulic cylinder construction are illustrated and described in application, Serial No. 314,432, filed by the present applicant and Emil J. Schleicher January 18, 1940, now Patent 2,319,950, May 25, 1943.

In the form of the invention shown in Figures 5-8 the inner side member 50 of the equalizer frame structure terminates with the axle bearing 51, and there is no transverse end member as indicated at 7 in Figure 1. The outer side member 52 terminates in an upright 53 forming a guide 54 for the bolster supporting frame 55 which is supported on member 52 by springs 56. Upright 53 also forms a seat 57 for the brake assembly bracket 58 which extends from the end of member 52 far enough to mount the braking units 59 and the brake shoes 60, but does not extend around the wheel to connect with the equalizer frame at the end of the truck, as shown in Figure 1.

Bracket 58 has vertical slots 61, and pins 62 extend transversely through slots 61 and through the shoes to slidably mount the shoes in the bracket.

Braking units 59 with connection 63 to master cylinder 64 correspond to the brake operating device previously described. It is to be understood that each unit 24, 25 may constitute a straight air operated double piston unit actuated from an air reservoir positioned as are the master cylinders 31, 64 and provided with the ordinary triple valve for admitting the air to the piston cylinders.

Both forms of the invention have the common feature of a rigid equalizer frame structure including side members positioned outwardly and inwardly of the wheels and the outer side members include uprights which form guides for the bolster supporting frame and rigidly support a brake assembly applicable to and removable from the wheel as a unit without disassembling other truck parts. This provides for the ready removal of the brake shoes. In addition, the braking units 25 and 59 may be removed independently of the shoes and without disassembling the bracket. Some features of the construction herein disclosed and claimed are embodied in other truck and brake arrangements covered by an application filed by the present applicant June 14, 1940, and bearing Serial No. 340,485, now Patent 2,273,635, February 17, 1942.

The structure attains the advantages set forth in the introductory portion of the specification irrespective of the details described, which are illustrative only, and the exclusive use of such modifications of the structure as come within the scope of the claims is contemplated.

What is claimed is:

1. In a railway truck, an axle, a wheel thereon having a brake drum surrounding the axle, equalizer framing mounted on said axle, drum engaging shoes movably mounted on said framing, and a fluid pressure operated double acting device received in said framing and including a cylinder with pistons movable along the cylinder axis, said device being movable in said framing transversely of said axis to a position in which the pistons may thrust said shoes towards said drum and to a position in which the unit may be removed in the direction of said axis from said framing independently of said shoes and other truck parts.

2. In a railway truck, a rotating axle, a wheel thereon having a brake drum on its outer face, a journal box on said axle inwardly of the wheel, equalizer framing extending adjacent the inner face of said wheel and supported in part on said box and held against substantial vertical movement relative to the box and wheel, a bracket detachably secured to said framing and extending longitudinally of the truck outwardly of the wheel and drum, brake shoes carried on said bracket to move normally vertically with said wheel and the bracket, and operating mechanism for said shoes also mounted on said bracket and movable vertically therewith.

3. A truck as described in claim 2 in which the outer end of the equalizer framing terminates adjacent to the axle and the framing includes a portion extending transversely of the truck and positioned between the wheel and the center of the truck and projecting outwardly beyond the vertical plane of the wheel, and the brake mounting bracket is secured to said framing portion and extends therefrom longitudinally of the truck abreast of the wheel with its outer end terminating adjacent the axle.

4. In a railway truck, spaced axles with wheels, a rigid framing structure extending between said axles and mounted directly thereon and held against vertical movement relative thereto, a brake drum at the side of at least one of said wheels opposite to the mounting of the framing structure, brake shoes spaced apart and associated with said drum, a power device for operating said shoes and positioned between them, said power device and shoes being surrounded by said drum and being carried directly by said framing structure and being movable vertically as a unit with the framing structure, axles and wheels.

5. In a railway truck, spaced axles with wheels, a rigid framing structure extending between said axles and mounted directly thereon, brake shoes spaced apart and associated with at least one of said wheels, there being a recess in the framing structure adjacent to said brake shoes, a power device seated in said recess and arranged to operate said shoes and positioned between them, the recess in the framing structure extending transversely of the vehicle from the device seat and opening outwardly of the structure perpendicular to the seat so that the power device can be removed from the truck while the shoes and framing structure remain assembled.

6. In a railway truck, spaced axles with wheels, a rigid framing structure extending between said axles and mounted directly thereon and movable vertically therewith, brake shoes associated with at least one of said wheels and spaced apart and arranged to frictionally contact portions of the wheel, and a single double-acting fluid pressure cylinder and piston unit between said brake shoes with its pistons disposed to directly engage said shoes and thrust them apart into contact with the cooperating wheel portions, said shoes and unit being in substantially the same vertical plane, and a bracket detachably secured to said framing and extending alongside of said wheel and diametrically thereof and mounting said brake shoes and unit 7. In a railway truck, spaced axles, wheels thereon, journal box and equalizer structure extending between and carried on said axles, springs on said structure between and spaced from said axles, a truck load supporting frame mounted on said springs and extending transversely of the truck over said structure and terminating longitudinally of the truck short of said axles, upright elements on said frame and structure opposing each other and guiding the frame and structure in their relative vertical movements, an annular brake drum on the outer face of at least one of the wheels, a brake power device with brake shoes associated therewith and opposing said drum, said device and shoes being mounted on the associated portion of said structure and being movable bodily therewith and operable independently of the relative movement of the load supporting frame on said springs.

8. Railway truck construction as described in claim 7 in which the brake shoes are at opposite sides of the corresponding axle and the power device is disposed abreast of the end of the axle and is positioned between the shoes.

9. Railway truck construction as described in claim 7 in which the power device comprises a double-acting fluid pressure cylinder and piston elements positioned abreast of the end of the axle and comprising a unit detachably mounted in the journal box and equalizer structure and removable therefrom while the wheels, axles, structure and load supporting frame and its supporting springs are in assembled relation.

10. In a railway truck, spaced axles with wheels, rigid framing structure extending between said axles and mounted directly thereon and held against vertical movement relative thereto and including a readily removable part extending alongside the outer face of one of said wheels, a brake drum on the outer side of said wheel adjacent to said part, brake shoes spaced apart and associated with said drum, a power device for operating said shoes and positioned between them, said power device and shoes being surrounded by said drum and being carried directly by said part and being removable therewith from said framing structure and wheel.

11. In a railway truck, spaced axles with wheels, at least one of said wheels being provided with a braking surface at its outer face, a rigid framing structure extending between said axles and mounted directly thereon and held against vertical movement relative thereto and including a readily removable part extending alongside of the outer face of said wheel, brake shoes associated with said braking surface, a power device associated with said shoes and including piston members movable into contact with said shoes for thrusting the latter against said surface, said power device, shoes and piston members being mounted on said framing part and normally moving vertically with the same and the associated axle and wheel and being removable from the wheel with said part as a unit.

CHARLES F. FREDE.